US012527706B2

(12) United States Patent
Shira et al.

(10) Patent No.: US 12,527,706 B2
(45) Date of Patent: Jan. 20, 2026

(54) PATIENT SUPPORT APPARATUS WITH MATTRESS AND MATTRESS COUPLER

(71) Applicant: Stryker Corporation, Kalamazoo, MI (US)

(72) Inventors: Emily Shira, Portage, MI (US); David Scharich, III, Coloma, MI (US)

(73) Assignee: Stryker Corporation, Portage, MI (US)

( * ) Notice: Subject to any disclaimer, the term of this patent is extended or adjusted under 35 U.S.C. 154(b) by 215 days.

(21) Appl. No.: 18/121,212

(22) Filed: Mar. 14, 2023

(65) Prior Publication Data

US 2023/0285212 A1 Sep. 14, 2023

Related U.S. Application Data

(60) Provisional application No. 63/319,465, filed on Mar. 14, 2022.

(51) Int. Cl.
*A61G 7/065* (2006.01)

(52) U.S. Cl.
CPC .................................... *A61G 7/065* (2013.01)

(58) Field of Classification Search
CPC ..... A47C 21/026; A47C 20/04; A47C 21/022; A47C 19/025; A47C 21/06; A47C 31/123; A47C 31/00; A47C 27/10; A47C 27/083; A47C 20/041; A47C 19/021; A47C 31/105; A47C 31/008; A47C 27/001; A47C 20/048; A47C 31/003; A47C 27/002; A61G 7/05; A61G 7/065; A61G 7/015; A61G 7/002; A61G 7/012; A61G 7/0514; A61G 7/053; A47G 9/04; Y10T 24/23; A47D 13/063; A47D 13/066; A47D 7/002
USPC ............................ 5/613, 499, 411, 658, 193
See application file for complete search history.

(56) References Cited

U.S. PATENT DOCUMENTS

| | | | | |
|---|---|---|---|---|
| 2,588,854 | A | 3/1952 | Lang | |
| 2,995,762 | A * | 8/1961 | Albinson .............. | A47C 23/00 5/411 |
| 3,769,643 | A | 11/1973 | Adler | |
| 4,899,404 | A | 2/1990 | Galumbeck | |
| 5,062,171 | A | 11/1991 | Vrzalik | |
| 5,499,410 | A | 3/1996 | Assink | |
| 6,003,178 | A | 12/1999 | Montoni | |
| 6,889,396 | B2 | 5/2005 | Weinman | |
| 6,952,852 | B2 | 10/2005 | Reeder et al. | |
| 7,047,579 | B2 | 5/2006 | Piana et al. | |
| 7,526,823 | B2 | 5/2009 | Koch | |
| 7,810,194 | B2 | 10/2010 | Clenet | |
| 8,176,582 | B2 | 5/2012 | Beard et al. | |
| 9,003,583 | B2 | 4/2015 | Schnake et al. | |

(Continued)

FOREIGN PATENT DOCUMENTS

| | | |
|---|---|---|
| EP | 1 541 109 | 6/2005 |
| EP | 2 181 624 | 5/2010 |

OTHER PUBLICATIONS

"Caregiver." Definition, Openmd.com, www.openmd.com/define/caregiver (Year: 2021).*

*Primary Examiner* — Madison Emanski
(74) *Attorney, Agent, or Firm* — Warner Norcross + Judd LLP

(57) ABSTRACT

A patient support apparatus is provided with a deck and a mattress. The patient support apparatus may include a mattress coupler to couple the mattress to the deck to limit, if not prevent, migration of the mattress relative to the deck.

12 Claims, 4 Drawing Sheets

(56) References Cited

U.S. PATENT DOCUMENTS

| | | | |
|---|---|---|---|
| 9,049,941 | B2 | 6/2015 | Clenet et al. |
| 9,107,782 | B2 | 8/2015 | Ermalovich |
| 9,308,146 | B2 | 4/2016 | Shan |
| 9,757,287 | B2 | 9/2017 | Tsukada et al. |
| 11,033,117 | B2 | 6/2021 | Wagner et al. |
| 11,185,454 | B2 | 11/2021 | Newkirk et al. |
| 2006/0117479 | A1 | 6/2006 | Kawakami et al. |
| 2014/0304914 | A1* | 10/2014 | Schnake .................. A61G 7/05 5/658 |
| 2019/0029439 | A1 | 1/2019 | Wagner et al. |
| 2021/0298488 | A1 | 9/2021 | Wagner et al. |
| 2021/0393050 | A1* | 12/2021 | Zadrozny ............... A47D 7/002 |

* cited by examiner

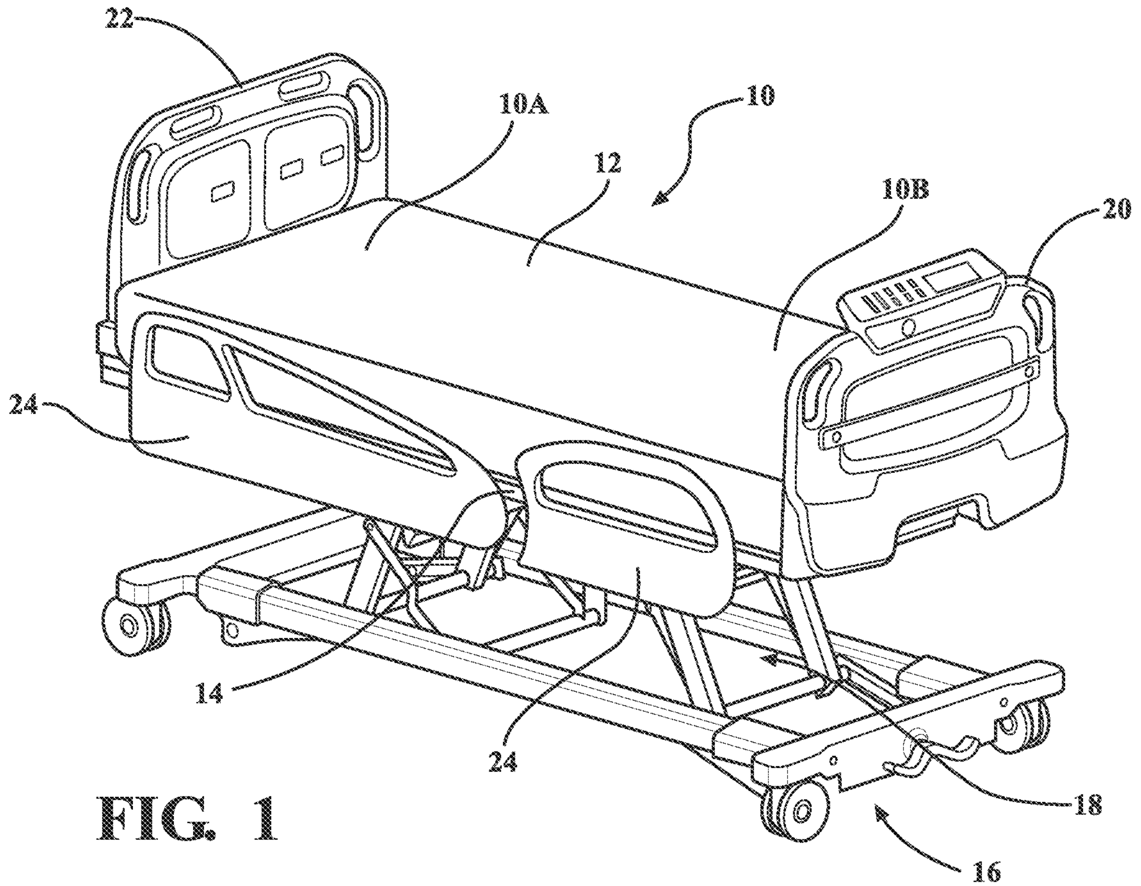
FIG. 1
FIG. 2
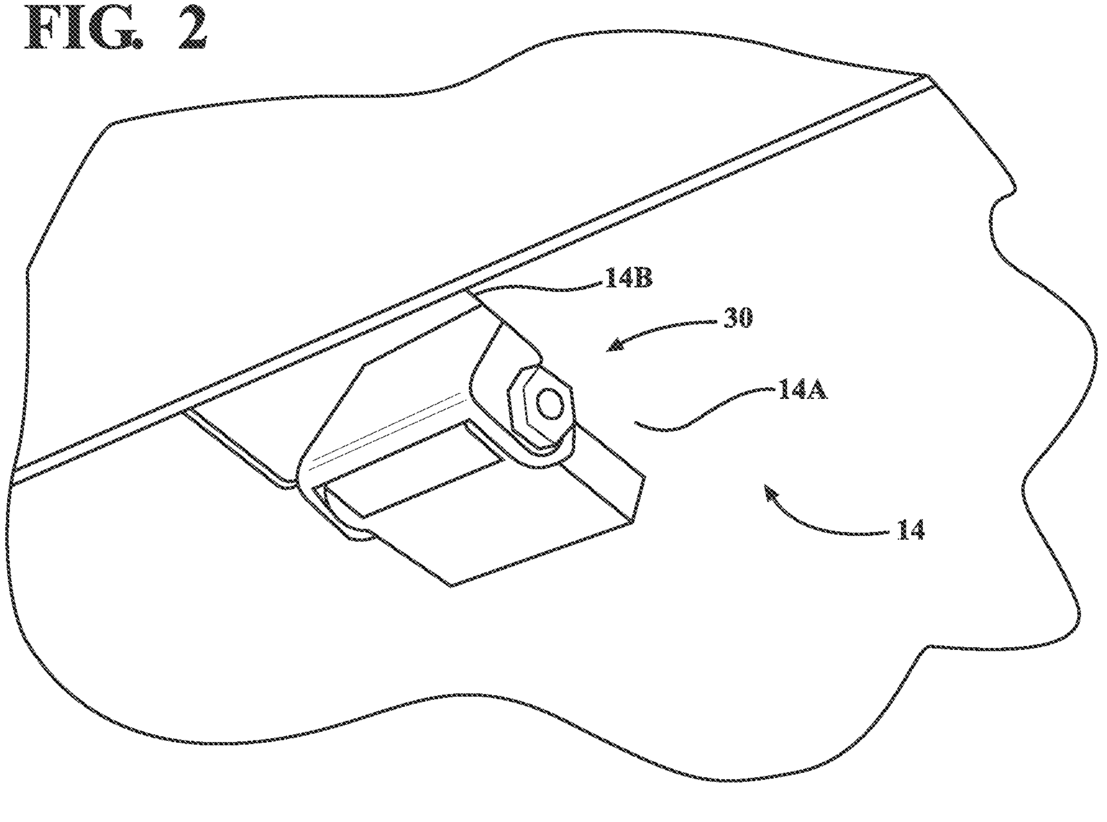

PATIENT SUPPORT APPARATUS WITH MATTRESS AND MATTRESS COUPLER

BACKGROUND

The present disclosure relates to patient support apparatuses, such as beds, cots, stretchers, recliners, or the like. More specifically, the present disclosure relates to patient support apparatuses that include a mattress with a mattress coupler.

Existing patient support apparatuses, such as hospital beds and/or stretchers, often include a pad or mattress. The pads or mattresses are typically supported on articulatable decks, with a back deck section referred to as the Fowler, a seat deck section, and a thigh deck section, which may or may not have a separate foot deck section, with each deck section being adjustable to allow a caregiver or patient the ability to adjust the angle of the deck section. To adjust the deck section, the patient support apparatus includes actuators to move the respective deck section.

When the back deck section is raised, the mattress or pad can migrate to the foot end of the deck. To retain the mattress in position, some mattresses or pads have straps, but they can be difficult to use. Accordingly, there is a need for a simpler way to retain the mattress or pad to avoid migration of the mattress. Hereinafter, reference will be made to a mattress to ease of reference.

SUMMARY

In one form, a patient support apparatus includes a deck and a mattress. The patient support apparatus also includes a mattress coupler to couple the mattress to the deck to limit, if not prevent, migration of the mattress relative to the deck.

In one aspect, the mattress coupler is reconfigurable between two or more configurations—such as an engaged configuration and a non-engaged configuration. Optionally, the mattress coupler may be biased in one or to one of the configurations, such as the engaged configuration.

In one form, the coupler is attached to or formed on the deck facing side of the mattress. For example, the mattress coupler may be attached to the mattress by an adhesive or one or more fasteners, or may be formed by molding or welding the mattress coupler to or with the mattress.

In one aspect, the non-engaged configuration of the mattress coupler is a compact configuration to facilitate insertion of the mattress coupler through an opening in the litter deck and thereafter, once inserted, is allowed to be reconfigured to its non-compact and engaged configuration to engage the deck adjacent the deck opening.

In one aspect, the compact, non-engaged configuration is a folded configuration, with a first portion of the mattress coupler attached to or formed with the mattress and a second portion that is movable relative to the first portion. For example, the second portion may be pivotally mounted to the first portion, such as by a hinge connection.

Optionally, the mattress coupler may be biased in or to its engaged configuration. For example, when formed with a second portion, the second portion may be biased in an extended orientation from the first portion to an engaged position.

Further, the second portion may include a cam surface to guide the second portion to its compact, non-engaged position when the mattress coupler makes contact with the litter deck.

In one aspect, the first portion of the coupler may include a base and a protecting arm extending from the base, with the base attached to or molded or welded to the mattress. The base and projecting member may be formed as a unitary member or may be assembled. The second portion may be a pivotal arm that is pivotally mounted to the first member, for example, to the projecting arm, by a pivot pin or pivot pins that extend into one end of the pivoting arm.

In one aspect, the mattress coupler includes one or more springs to urge and bias the second portion in or to its engaged position. For example, the second portion may be pivotal mounted to the first portion by a pin or pins, with the spring or springs mounted about the pin or pins to form a torsional spring that biases the pivotal arm into its non-compact, engaged position.

In one aspect, the mattress may include a cover, with the mattress coupler attached to, molded with, or welded to the mattress cover.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

BRIEF DESCRIPTION OF THE DRAWINGS

FIG. 1 is a perspective view of a patient support apparatus with a mattress and a mattress coupler supported on the litter deck;

FIG. 2 is an enlarged bottom perspective of the litter deck engaged by the mattress coupler;

DETAILED DESCRIPTION

Figure 3:
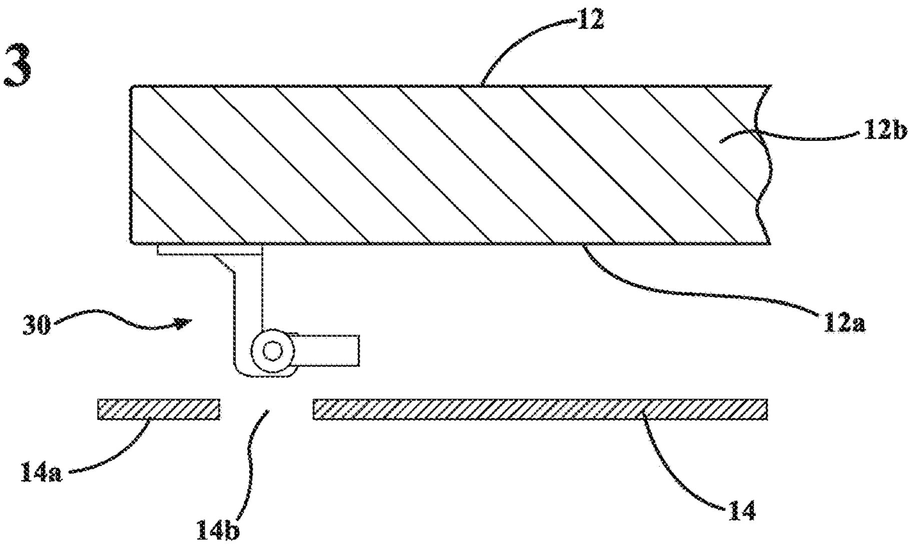
FIG. 3 is a schematic exploded side elevation view of the mattress and the litter deck illustrating the mattress coupler in an engaged configuration.

Referring to FIG. 1, the numeral 10 generally designates a patient support apparatus. Although patient support apparatus 10 illustrated in FIG. 1 is a bed adapted for use in a hospital or other medical setting, it will be understood that patient support apparatus 10 may be a cot, a stretcher, a gurney, a recliner, a residential bed, or any other structure capable of supporting a patient, whether stationary or mobile and/or whether used in a medical or residential setting.

In general, patient support apparatus 10 includes a mattress 12 that is supported on a litter deck 14, which in turn is supported on a litter frame (not shown). Litter deck 14 may have one or more articulatable deck sections, including a back deck section ("Fowler"), a seat deck section, and a thigh deck section, which together with the litter frame are supported on a wheeled base 16 by a lift assembly 18. Patient support apparatus 10 further includes a footboard 20, a headboard 22, and a plurality of side rails 24. Side rails 24 are all shown in a lowered position in which ingress into, and egress out of, patient support apparatus 10 is not obstructed by the lowered side rails 24, but are each individually movable to a raised position. In some embodiments, side rails 24 may be moved to one or more intermediate positions as well.

Lift assembly 18 is adapted to raise and lower the litter frame and litter deck 14 with respect to base 16 and may incorporate actuators, such as electric actuators, hydraulic actuators, pneumatic actuators, or any other suitable device for raising and lowering the litter frame and litter deck 14. The actuators may be operated independently so that the litter frame and litter deck may be tilted (with respect to base 16), such as in a Trendelenburg orientation or in a reverse Trendelenburg orientation. The patient support apparatus 10 may also incorporate actuators, such as electric actuators, hydraulic actuators, pneumatic actuators, or any other suitable device, for moving the individual deck sections. The head deck section, which as noted may be referred to as the Fowler, is pivotable about a generally horizontal pivot axis between a generally horizontal orientation (shown in FIG. 1) and a plurality of raised positions (not shown). The thigh and foot deck sections may also be pivotable about generally horizontal pivot axes.

In some embodiments, patient support apparatus 10 may be modified from what is shown to include one or more components adapted to allow the user to extend the width of patient support deck 14, thereby allowing patient support apparatus 10 to accommodate patients of varying sizes. When so modified, the width of deck 14 may be adjusted, for example between a first or minimum width, a second or intermediate width, and a third or expanded/maximum width. The first standard width may be, for example, a 36 inch width, the second intermediate width may be, for example a 42 inch width, and the third more expanded width may be, for example, a 48 inch width, although these numerical widths may be varied to comprise different widths.

As used herein, the term "longitudinal" refers to a direction parallel to a central axis between the head end 10*a* and the foot end 10*b* of patient support apparatus 10. The terms "transverse" or "lateral" refer to a direction perpendicular to the longitudinal direction and parallel to a surface on which the patient support apparatus 10 rests.

As noted above, when the back deck section or Fowler is raised (or when the deck itself is tilted in the Trendelenburg orientation), mattress 12 may have a tendency to migrate (along with a patient supported thereon) toward the foot end of the patient support apparatus. This can put pressure on the footboard, pull on any tubing or cables that run to the mattress, and miss-locate the mattress relative to the deck sections. Further, if the patient is hooked up to an IV, this migration may pull on the IV line. Referring to FIG. 2, patient support apparatus 10 may include a mattress coupler 30 to couple the mattress 12 to the litter deck 14 to limit, if not prevent, migration of the mattress 12 relative to the deck 14. As will be more fully described below, mattress coupler 30 is reconfigurable between two or more configurations-such as an engaged configuration (such as shown in FIG. 2) and a non-engaged configuration (such as shown in FIG. 4).

Optionally, the mattress coupler 30 may be attached to or formed on the deck facing side 12*a* of the mattress 12 for engagement with the deck 14, for example, the litter deck skin 14*a*. For example, the mattress coupler 30 may be attached to the mattress 12, such as the mattress cover 12*b*, by an adhesive or one or more fasteners, including VELCRO strips or patches, or may be formed by molding the mattress coupler to or with the mattress, such as to or with the mattress cover. Alternately, the coupler may be welded to the mattress, such as to the mattress cover, using RF welding. Suitable mattress covers may be made with a polyester or nylon core or substrate with a weldable polyurethane coating, and with coupler 30 welded to or molded with cover via the coating. It should be understood that the cover may be formed with or reinforced with inserts, such as plastic plates or panels, where the coupler is attached. In this manner, the coupler may be attached in a way that it is not removable from the mattress or, as noted, may be attached in a way that is removable.

Figure 4:
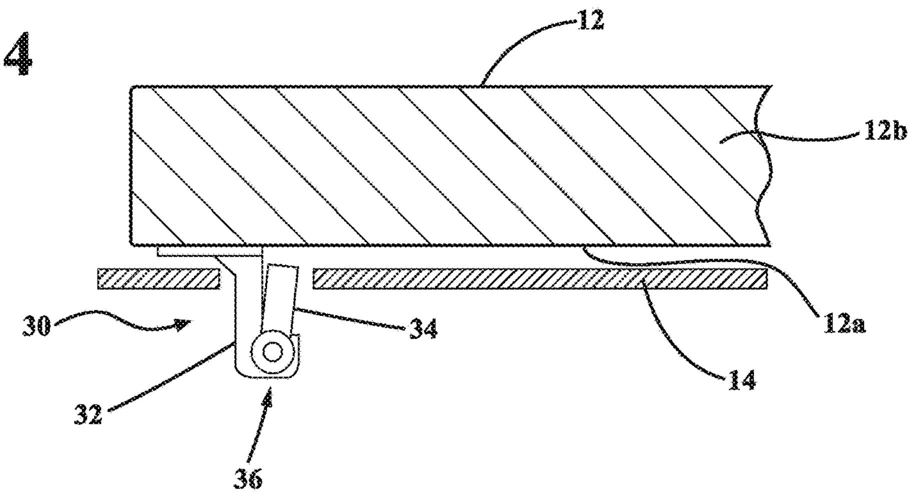
FIG. 4 is a similar view to FIG. 3 illustrating the insertion of the mattress coupler into the litter deck with the mattress coupler in a compact, non-engaged configuration.
Figure 5:
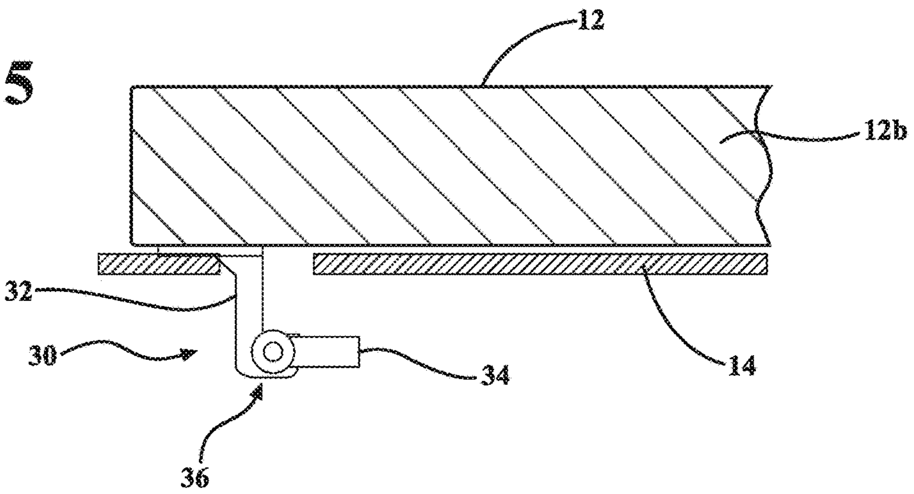
FIG. 5 is a similar view to FIG. 4 illustrating the mattress coupler returned to its engaged configuration and engaged with the litter deck.
Figure 8:
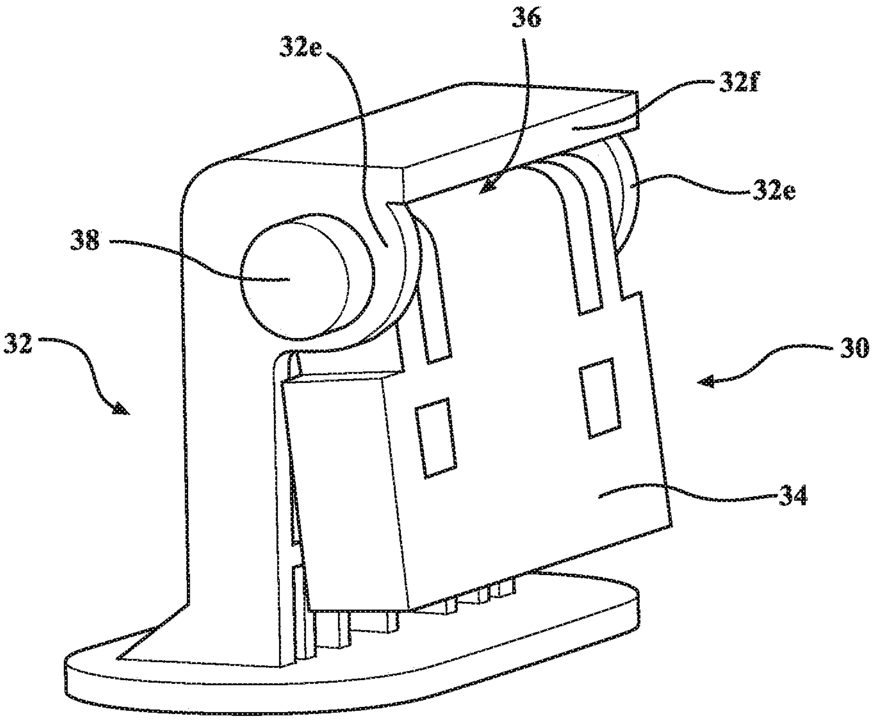
FIG. 8 is a similar view to FIG. 6 illustrating the coupler in its compact, non-engaged configuration.

Referring to FIGS. 4 and 8, mattress coupler 30 may be reconfigured between a compact, non-engaged configuration to facilitate insertion of the mattress coupler 30 through an opening 14*b*, for example, in the litter deck skin 14*a*. Thereafter, once inserted, coupler 30 is allowed to be reconfigured to its non-compact and engaged configuration to engage the deck adjacent the deck opening, such as shown in FIG. 5. In one aspect, the compact, non-engaged configuration is a folded configuration, with a first portion 32 of the mattress coupler attached to or formed with the mattress 12 and a second portion 34 that is movable relative to the first portion 32 from a non-engaged position to an engaged position. In the illustrated embodiment, the second portion 34 may be pivotally mounted to the first portion 32, such as by a hinge connection 36.

Figure 6:
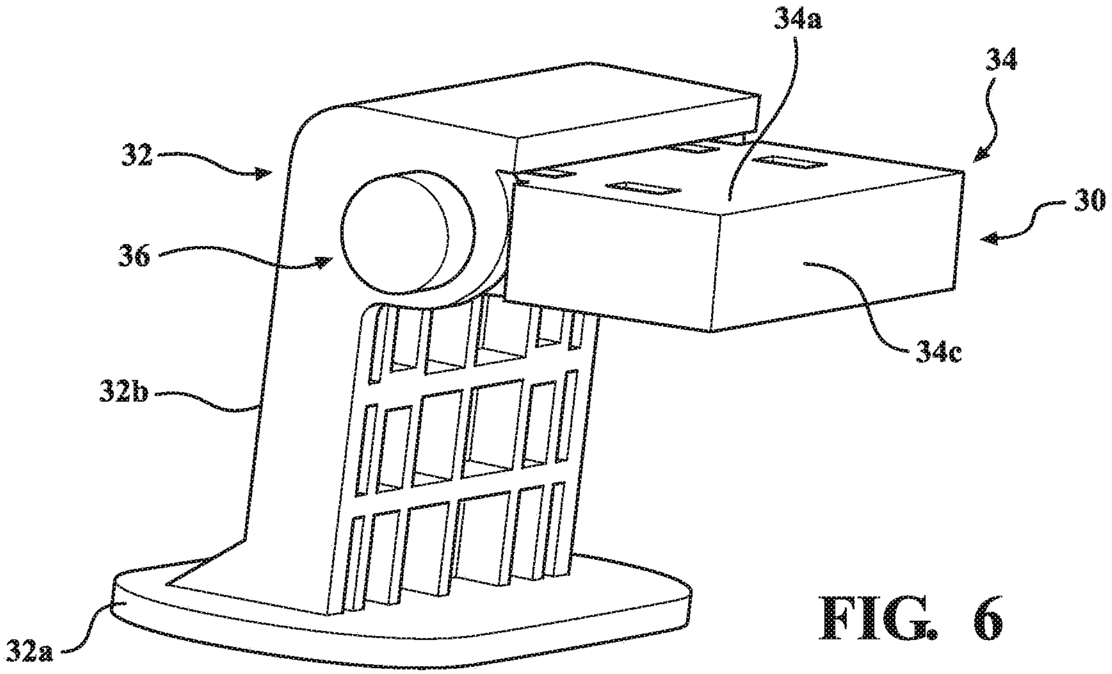
FIG. 6 is an enlarged inverted perspective view of the mattress coupler in its engaged configuration.
Figure 7:
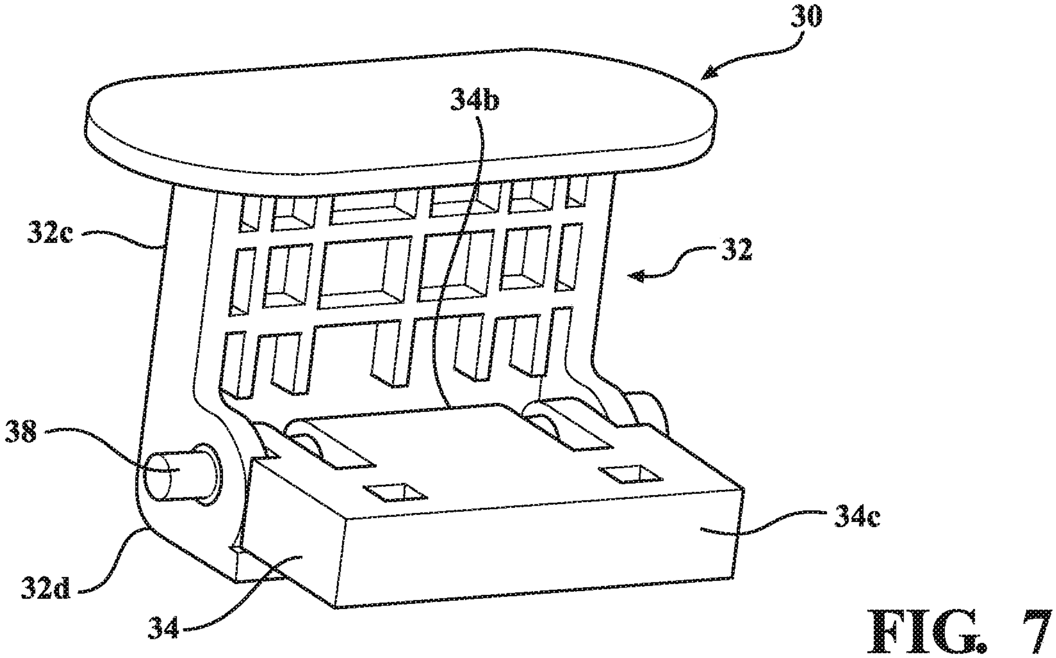
FIG. 7 is an inverted perspective view of the retainer of FIG. 6.

Optionally, the mattress coupler 30 may be biased in one of its configurations, such as in its engaged configuration. For example, when formed with a second portion, the second portion 34 may be biased in an extended orientation from the first portion 32 to an engaged position. As best seen in FIGS. 6-8, the first portion 32 of the coupler 30 may include an enlarged base 32*a* and a projecting arm 32*b* extending from the base, with the base 32*a* attached to or molded or welded with the mattress. Projecting arm 32*b* may have a generally L-shaped cross-section with a vertical leg 32*c* joined with base 32*a* and a horizontal leg 32*d* joined with or formed at the distal end of vertical leg 32*c*. The base 32*a* and projecting member 32*b* may be formed as a unitary member or may be assembled. The terms vertical and horizontal are used for reference only and in reference to the orientations shown in FIGS. 6-8.

As best seen in FIG. 7, the second portion 34 may be a pivotal arm 34*a* that is pivotally mounted to the first member 32, for example, to the projecting arm 32*b*, by a pivot pin or pivot pins 38 that extend into one end of the pivoting arm to form the hinge connection 36. Pin or pins 38 may be mounted to the distal portion of projecting arm 32*b* and extend between webs or flanges 32*e* formed at the juncture of legs 32*c* and 32*d* of the first portion. In this manner, proximal end 34*b* of pivotal arm 34*a* may be captured on pin or pins 38 between webs 32*e* (FIGS. 7 and 8) such that horizontal leg 32*d* forms a stop 32*f* described below. The proximal end 34*b* may be opposite a distal end 34*c* of the pivotal arm 34*a*.

Figure 9:
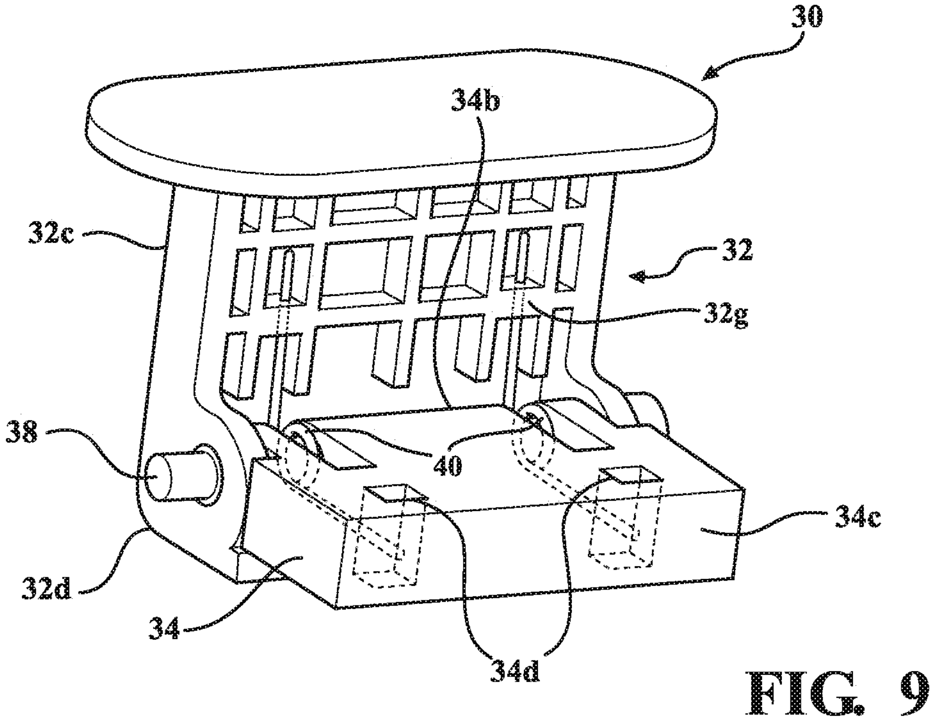
FIG. 9 is a similar view to FIG. 7 illustrating two springs biasing the coupler in its engaged configuration.

To bias the coupler 30 to one of its configurations, the mattress coupler 30 may include one or more springs 40 (FIG. 9). In the illustrated embodiment, springs 40 are configured to urge and bias the second portion to and in its engaged position. For example, the second portion 34 may be pivotal mounted to the first portion 32 by a pin or pins 38, with the springs 40 mounted about the pin (or pins) to form a torsional spring that biases the second portion 34 into its non-compact, engaged position or at least towards its non-compact, engaged position.

Springs 40 may comprise L-shaped coiled springs mounted about the pin or pins with two spring arms—one spring arm captured in the second portion, and the other spring arm captured in the first portion. For example, as best seen in FIG. 9, the spring arms may be captured in recess or openings 34*d* formed in arm 34*a* and, for example, in reinforcing webs 32*g* or other engagement structures formed in first portion 32. Alternately, both spring arms may be captured in the first portion.

Optionally, the springs 40 may only generate a spring force when the second portion is moved away from its engaged position toward its non-engaged position and, therefore, simply applies a biasing force to return the second portion to its engaged position rather than holding it in its engaged position.

Additionally, coupler 30 may include a stop that prevents further pivoting of second portion 34 beyond its engaged position, with the spring biasing second portion 34 to the stop. For example, the stop 32*f* (FIG. 7) may be formed by horizontal leg 32*d*, as noted above.

Alternately, the stop may be formed on arm 34*a*. The stop may comprise enlargement or projection at the proximal end (adjacent hinge connection 36) of the arm that engages first portion 32, for example at the vertical leg 32*b*, when arm 34*a* is moved to its engaged position so that arm 34*a* cannot rotate beyond the engaged position.

In this manner, the stop prevents second portion 34 from pivoting any further than the position shown in FIGS. 5 and 6, and, hence, prevents the mattress from lifting up unintentionally.

Alternately, the horizontal leg may be shortened or notched so that it no longer forms a mechanical stop for arm 34*a*. Instead, the springs may prevent further rotation of second member 34 or the springs may provide controlled rotation—meaning, only when a sufficient force is applied to the mattress to extend the springs further can the second member rotate beyond its engaged position to allow the mattress to be decoupled from the deck. For example, second portion 34 may be pivoted beyond its engaged position, where it would form an obtuse angle (including being generally parallel) with respect to the first portion as viewed in FIG. 3. In this configuration, the mattress may be decoupled from the deck by simply lifting the mattress with sufficient force to force the springs to allow further rotation, rather than requiring a caregiver to return arm 34*a* to its compact, non-engaged position Referring to FIG. 3, when the mattress is lowered, the second portion of coupler 30 (which is normally in its non-compact, engaged position) contacts the deck 14, which causes the second portion 34 to pivot upwardly (against the force of the spring), as viewed in FIG. 4, and move to its compact, non-engaged position. When in its compact, non-engaged configuration, coupler 30 can pass through opening 14*b* and allow the mattress 12 to rest on the deck (as understood from FIG. 5). Once the second portion has fully passed through opening 14*b*, second portion 34, under the spring for of springs 40, can return to its engaged configuration where it extends under the deck to thereby couple the mattress to the deck. Thus, when mattress 12 is placed on the litter deck and the mattress coupler 30 is aligned with opening 14*b* in litter deck 14, a caregiver can simply lower the mattress onto the deck to couple the mattress to the deck.

In one form the coupler is configured to provide feedback to the caregiver when the coupler is properly engaged with the deck. For example, the coupler may be configured to generate an audible notification. In one form, the spring or springs may be sized so that when the second portion returns to its engaged position by the spring or springs, the spring or springs return the second portion with such force that when it makes contact with the first portion, it makes an audible sound. The sound can be varied by the size of the force of the springs, the material selection of the first and second portions, and by optionally providing metal inserts in one or both of the first and second portions at their interface when in the engaged positon.

The number of and location of the coupler may vary. But to simplify its disconnect, a single coupler may be used and located along the interface with the Fowler. In this manner, to uncouple the mattress, the caregiver may simply raise the Fowler and then reach in to push the second portion of the coupler upwardly while, or shortly thereafter, lifting the mattress at least sufficiently to capture the folded second portion in the opening of the deck.

As best seen in FIG. 4, second portion 34 may have a length that is shorter than the height of first portion so that second portion 34 can return to its engaged portion before the mattress coupler 30 is fully passed through opening. Further, as best understood from FIG. 5, when coupler 30 is inserted through opening 14*b* of deck 14 and the coupler is now in its engaged configuration, if the mattress migrates in any direction, the corresponding perimeter edge of opening 14*b* (in the direction of movement) will contact the first portion 32 of coupler 30 to stop further movement of the mattress. As would be understood, therefore, the size and shape of the opening will control how far the mattress 12 can move in the longitudinal directions and/or lateral directions. For example, in a bariatric application, the opening in the deck may be slotted (have a longer dimension) in the lateral direction to allow the deck to expand without interference form the mattress.

Additionally, the size of opening 14*b* and size of first and second portions 32 and 34 will dictate the compact configuration of coupler. As best seen in FIG. 4, when in its compact, non-engaged configuration, the second portion will pivot so that it is closely adjacent or even touching first portion 32. However, the opening (and/or size of coupler) may be selected so that second portion 34 may be simply urged upwardly such that coupler 30 can pass through the opening and form an acute angle with respect to first portion 32, leaving a gap between the first portion and the second portion. Alternately, the opening and coupler dimensions and shape may be such that second portion 34 nests, at least partially, within the first portion 32, for example, in a recess provided in the first portion so that the first portion straddles the second portion when the second portion is moved to its compact non-engaged position.

The construction of coupler 30 may vary. For example, first portion 32 and second portion 34 may be formed from plastic, such as molded plastic blocks, while hinge connection, namely pin or pins 38, may be metal. As such first and second portions may be solid or hollow and molded with various shapes and features, such as reinforcement webs and also with guide surfaces, such as a cam surface, to help and further guide the coupler between its compact non-engaged configuration and non-compact engaged configuration. Additionally, when formed from plastic, the coupler 30, as noted, can be molded with or welded to the mattress, such as the cover.

It will be understood by those skilled in the art that patient support apparatus 10 can be designed with other types of mechanical constructions, such as, but not limited to, that are described in commonly assigned, U.S. Pat. No. 10,130,536 to Roussy et al., entitled PATIENT SUPPORT USABLE WITH BARIATRIC PATIENTS, the complete disclosure of which is incorporated herein by reference. In another embodiment, the mechanical construction of patient support apparatus 10 may be the same as, or nearly the same as, the mechanical construction of the Model 3002 S3 bed manufactured and sold by Stryker Corporation of Kalamazoo, Michigan. This mechanical construction is described in greater detail in the Stryker Maintenance Manual for the MedSurg Bed, Model 3002 S3, published in 2010 by Stryker Corporation of Kalamazoo, Michigan, the complete disclosure of which is incorporated herein by reference. It will be understood by those skilled in the art that patient support apparatus 10 can be designed with still other types of mechanical constructions, such as, but not limited to, those described in commonly assigned, U.S. Pat. No. 7,690,059 issued to Lemire et al., and entitled HOSPITAL BED; and/or commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosures of both of which are also hereby incorporated herein by reference. The mechanical construction of patient support apparatus 10 may also take on still other forms different from what is disclosed in the aforementioned references.

Although not described herein, it should be understood that patient support apparatus 10 may include other features, such as a bed exit system, alert or alarm systems, scale systems, and control systems that control the various actuators and optionally the mattress in the case of an inflatable mattress. Further, mattress 12 may comprise a variety of different mattresses with a variety of different cushioning components, such as foam, foam in combination with bladders, foam in combination with one or more gel layers, or foam in combination with bladders and one or more gel layers, and may include a mattress control system incorporated into the mattress and contained, for example, within the foot end of the mattress in a mattress control housing, such as disclosed in U.S. Pat. Nos. 5,542,136; 5,325,551; 8,910,334 (STR03A-P239A); U.S. Pat. No. 8,911,387 (STR03A-P257A); U.S. Pat. Nos. 7,406,736; 9,820,904 (STR03A-P376A), and U.S. Pat. No. 9,468,307 (STR03A P400A), which are commonly owned by Stryker Corporation of Kalamazoo, Michigan, and are incorporated by referenced in their entireties herein.

For suitable controls, bed exits systems, and/or alert or alarm systems, scale systems, as well as other features, reference is made to co-pending applications: U.S. Pat. Appl. Ser. No. 63/294,096 entitled PATIENT SUPPORT APPARATUS WITH LOCKING FEATURES, filed on Dec. 28, 2021 and U.S. Pat. Appl. Ser. No. 63/255,240 entitled PATIENT SUPPORT APPARATUS WITH LOCKING FEATURES, filed on Oct. 13, 2021; U.S. Pat. Appl. Ser. No. 62/889,254 filed Aug. 20, 2019, by inventors Sujay Sukumaran et al. and entitled PERSON SUPPORT APPARATUS WITH ADJUSTABLE EXIT DETECTION ZONES; U.S. patent application Ser. No. 17/318,476 filed May 12, 2021, by inventors Sujay Sukumaran et al. and entitled PATIENT SUPPORT APPARATUS WITH AUTOMATIC EXIT DETECTION MODES OF OPERATION; and/or the exit detection system disclosed in commonly assigned U.S. Pat. No. 5,276,432 issued to Travis and entitled PATIENT EXIT DETECTION MECHANISM FOR HOSPITAL BED, which are all commonly owned by Stryker Corporation and incorporated by reference in their entireties herein.

Further details of one type of monitoring system that may be built into patient support apparatus 10 are disclosed in commonly assigned U.S. Pat. Appl. Ser. No. 62/864,638 filed Jun. 21, 2019, by inventors Kurosh Nahavandi et al. and entitled PATIENT SUPPORT APPARATUS WITH CAREGIVER REMINDERS, as well as commonly assigned U.S. patent application Ser. No. 16/721,133 filed Dec. 19, 2019, by inventors Kurosh Nahavandi et al. and entitled PATIENT SUPPORT APPARATUSES WITH MOTION CUSTOMIZATION, the complete disclosures of both of which are incorporated herein by reference. Other types of monitoring systems may be included within patient support apparatus 10 for monitoring parameters of the patient support apparatus 10.

In some embodiments, the patient support apparatus 10 may include a scale system with any of the same features, components, and/or and functions as the scale systems disclosed in the following commonly assigned patent references: U.S. Pat. Appl. Ser. No. 62/889,254 filed Aug. 20, 2019, by inventors Sujay Sukumaran et al. and entitled PERSON SUPPORT APPARATUS WITH ADJUSTABLE EXIT DETECTION ZONES; U.S. Pat. Appl. Ser. No. 63/255,211 filed Oct. 13, 2021, by inventors Sujay Sukumaran et al. and entitled PATIENT SUPPORT APPARATUS WITH AUTOMATIC SCALE FUNCTIONALITY; U.S. Pat. No. 10,357,185 issued to Marko Kostic et al. on Jul. 23, 2019, and entitled PERSON SUPPORT APPARATUSES WITH MOTION MONITORING; U.S. Pat. No. 11,033,233 issued to Michael Hayes et al. on Jun. 15, 2021, and entitled PATIENT SUPPORT APPARATUS WITH PATIENT INFORMATION SENSORS; U.S. patent application Ser. No. 16/992,515 filed Aug. 13, 2020, by inventors Kurosh Nahavandi et al. and entitled PATIENT SUPPORT APPARATUS WITH EQUIPMENT WEIGHT LOG; and U.S. Pat. Appl. Ser. No. 63/255,223, filed Oct. 13, 2021, by inventors Sujay Sukumaran et al. and entitled PATIENT SUPPORT APPARATUS WITH PATIENT WEIGHT MONITORING, the complete disclosures of all of which are incorporated herein by reference.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

We claim:

1. A patient support apparatus comprising:
a deck;
a mattress; and
a reconfigurable mattress coupler to couple said mattress to said deck to limit or prevent migration of said mattress relative to said deck, wherein said mattress coupler includes a base and a projecting arm extending from said base, said base being attached to said mattress, said mattress coupler including a pivotal arm pivotally mounted to said projecting arm, wherein said pivotal arm is biased toward a non-compact, engaged position, such that said pivotal arm pivots toward said projecting arm in response to insertion of said mattress coupler into an opening of said deck and said pivotal arm returns to said non-compact, engaged position after insertion of said mattress coupler into said opening of said deck,
wherein said mattress coupler is reconfigurable between an engaged configuration to couple said mattress with said deck and a non-engaged configuration to release said mattress from being coupled with said deck,
wherein said mattress coupler is biased in one of said engaged or non-engaged configurations, and
wherein said mattress coupler is biased in said engaged configuration so that said pivotal arm is biased toward said non-compact, engaged position.

2. The patient support apparatus of claim 1, wherein said mattress includes a deck facing side, and said mattress coupler is attached to or formed on said deck facing side of said mattress.

3. The patient support apparatus of claim 2 wherein said mattress has a cover, said mattress coupler is welded to said cover.

4. A patient support apparatus comprising:
a deck;
a mattress; and
a reconfigurable mattress coupler to couple said mattress to said deck to limit, if not prevent, migration of said mattress relative to said deck, wherein said mattress coupler includes a base and a projecting arm extending from said base, said base being attached to said mattress, said mattress coupler including a pivotal arm pivotally mounted to said projecting arm, wherein said pivotal arm is biased toward a non-compact, engaged position, such that said pivotal arm pivots toward said projecting arm in response to insertion of said mattress coupler into an opening of said deck and said pivotal arm returns to said non-compact, engaged position after insertion of said mattress coupler into said opening of said deck,
wherein said mattress coupler is reconfigurable between an engaged configuration to couple said mattress with said deck and a non-engaged configuration to release said mattress from being coupled with said deck,
wherein said mattress coupler is biased in one of said configurations, and
wherein said non-engaged configuration of said mattress coupler being a compact configuration to facilitate insertion of said mattress coupler through said opening, and after insertion, said mattress coupler is configured to return to said engaged configuration with said pivotal arm extending away from said projecting arm to engage said deck adjacent said opening of said deck.

5. The patient support apparatus of claim 4, wherein said non-engaged configuration is a folded configuration for insertion of said mattress coupler into said opening.

6. A patient support apparatus comprising:
a deck;
a mattress; and
a reconfigurable mattress coupler to couple said mattress to said deck to limit, if not prevent, migration of said mattress relative to said deck, wherein said mattress coupler includes a base and a projecting arm extending from said base, said base being attached to said mattress, said mattress coupler including a pivotal arm pivotally mounted to said projecting arm, wherein said pivotal arm is biased toward a non-compact, engaged position, such that said pivotal arm pivots toward said projecting arm in response to insertion of said mattress coupler into an opening of said deck and said pivotal arm returns to said non-compact, engaged position after insertion of said mattress coupler into said opening of said deck,
wherein said mattress coupler is reconfigurable between an engaged configuration to couple said mattress with said deck and a non-engaged configuration to release said mattress from being coupled with said deck,
wherein said mattress coupler is biased in one of said configurations,
wherein said non-engaged configuration is a folded configuration for insertion of said mattress coupler into said opening, and
wherein said pivotal arm is pivotally mounted to said projecting arm by a hinge connection.

7. The patient support apparatus of claim 1, wherein said pivotal arm is pivotally mounted to said projecting arm by a pivot pin or pivot pins extending into one end of said pivotal arm.

8. A patient support apparatus comprising:
a deck;
a mattress;
a reconfigurable mattress coupler to couple said mattress to said deck to limit, if not prevent, migration of said mattress relative to said deck, wherein said mattress coupler includes a base and a projecting arm extending from said base, said base being attached to said mattress, said mattress coupler including a pivotal arm pivotally mounted to said projecting arm, wherein said pivotal arm is biased toward a non-compact, engaged position, such that said pivotal arm pivots toward said projecting arm in response to insertion of said mattress coupler into an opening of said deck and said pivotal arm returns to said non-compact, engaged position after insertion of said mattress coupler into said opening of said deck, wherein said pivotal arm is pivotally mounted to said projecting arm by a pivot pin or pivot pins extending into one end of said pivotal arm; and
a spring mounted about said pivot pin or pivot pins to form a torsional spring biasing said pivotal arm to said non-compact, engaged position.

9. A patient support apparatus comprising:
a deck;
a mattress; and
a mattress coupler to couple said mattress to said deck to limit migration of said mattress relative to said deck, said mattress coupler including a base and a projecting arm extending from said base, said base being attached to said mattress, said mattress coupler including a pivotal arm pivotally mounted to said projecting arm, said mattress coupler operable to re-configure in response to contact with said deck during coupling between said mattress and said deck, such that said pivotal arm pivots toward said projecting arm in response to insertion of said mattress coupler into an opening of said deck and said pivotal arm returns to a non-compact, engaged position after insertion of said mattress coupler into said opening of said deck, wherein said mattress coupler is biased in one of an engaged configuration or a non-engaged configuration, and wherein said mattress coupler is biased in said engaged configuration so that said projecting arm is biased toward said non-compact, engaged position.

10. The patient support apparatus of claim 9, wherein said mattress coupler is operable to decouple from said deck in response to a user manually re-configuring said mattress coupler to fit within said opening of said deck.

11. The patient support apparatus of claim 9, wherein said mattress coupler is reconfigurable between said engaged configuration to couple said mattress with said deck and said non-engaged configuration to release said mattress from being coupled with said deck.

12. The patient support apparatus of claim 9 wherein said mattress includes a deck facing side, and said mattress coupler is attached to or formed on said deck facing side of said mattress.

* * * * *